April 18, 1939.                B. B. WEATHERBY                2,154,548
                                SEISMIC SURVEYING
                              Filed Sept. 24, 1936
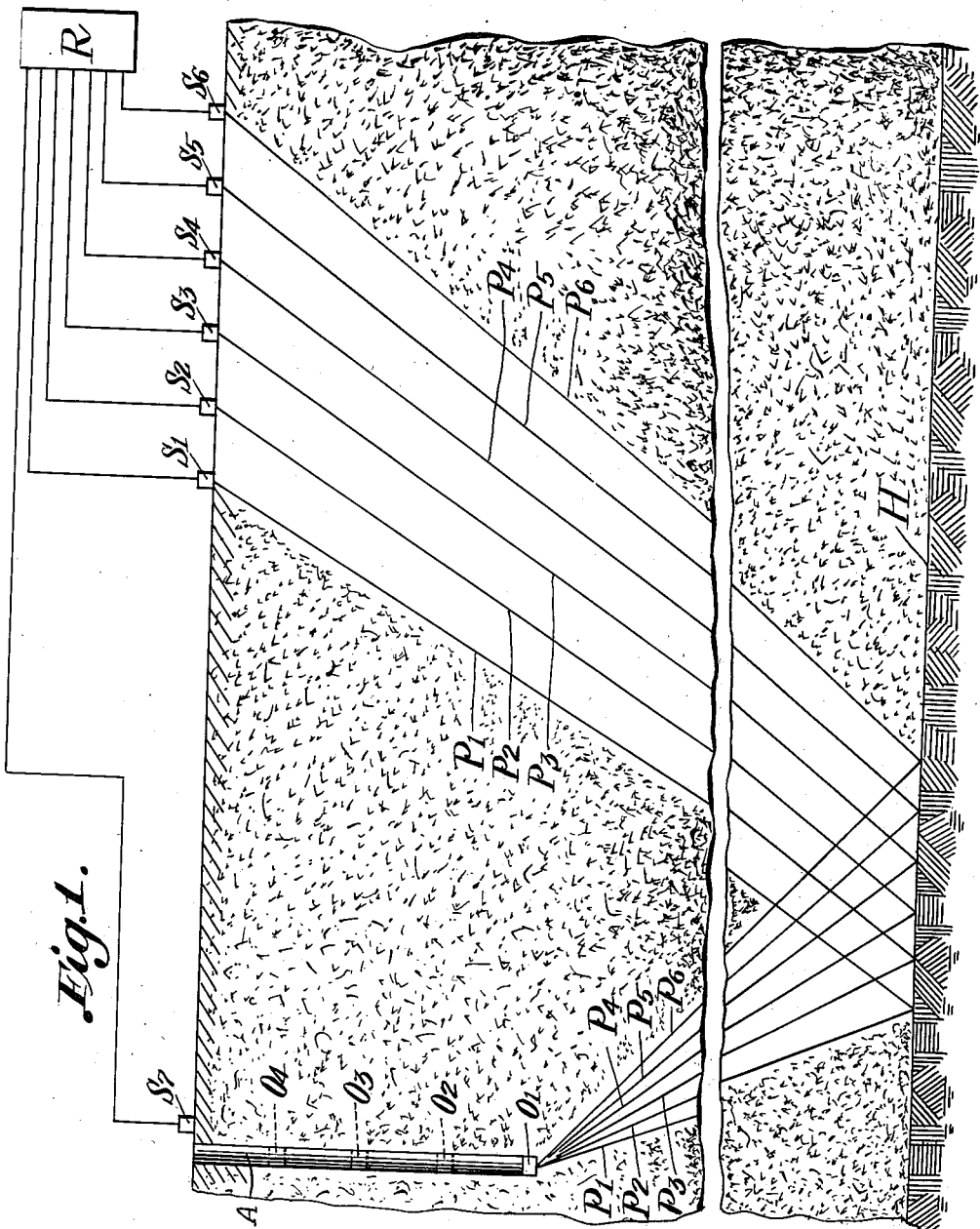
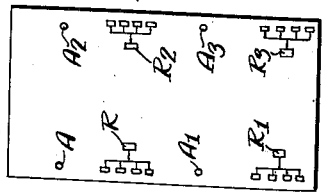
INVENTOR.
Benjamin B. Weatherby
BY
Kenyon & Kenyon
ATTORNEYS.

Patented Apr. 18, 1939

2,154,548

UNITED STATES PATENT OFFICE 2,154,548

SEISMIC SURVEYING

Benjamin B. Weatherby, Tulsa, Okla., assignor to Geophysical Research Corporation, New York, N. Y., a corporation of New Jersey Application September 24, 1936, Serial No. 102,258

1 Claim. (Cl. 181—0.5)

This invention relates to sub-surface seismic surveying and is particularly applicable in the art of making reflection seismic surveys by the correlation method. The basis of this method is the similarity in appearance of records of reflections obtained from a given sub-surface stratographic horizon extending over a considerable area. To obtain such reflection records, explosive charges are detonated in a plurality of bore holes distributed over the area and reflected waves are received at recording stations associated with the bore holes, there being a receiving station individual to each bore hole. Because of above referred-to similarity of records, it is possible to calculate the variation in depth of the reflecting horizon over considerable areas by first correlating the reflection records at different points in the area under investigation, that is, by identifying corresponding phases of the same reflection on each record and then calculating the depth to the reflecting horizon at each point. These calculations are based upon the time intervals between the detonation of the seismic charge and the arrival at several spaced receiving stations of the same phase of the corresponding reflections as indicated by the several records. Obviously, this method cannot be used if the appearance or character of the record of the reflection coming from the sub-surface horizon being mapped changes radically from one recording position to another. If the changes are so great that it becomes impossible to correlate the records, i. e. to identify corresponding phases of the reflections on the several records, then the variation in the depth to the reflecting horizon cannot be accurately followed.

I have found that a serious cause of character variation in reflections coming from a given sub-surface horizon is directly connected with the nature of the impulse generated at the shot position by the detonation of the seismic charge and that some areas are characterized by a surface layer of such nature that an explosive charge detonated at some depth or depths in a bore hole produces a seismic record which is not correlatable with records obtained by detonation of charges in other similar bore holes in that area.

An object of this invention is to minimize as far as possible the possibility of mis-correlation of reflection seismic records.

According to the invention a series of records are made at each selected recording position, each record showing the waves received by a number of wave detectors located at different distances from the shot position, together with suitable timing lines and indication of the shot instant. Preferably, these records show also the wave received by a detector planted on the surface at the shot position directly above the seismic charge. Successive records of the series are made by detonating the seismic charge at the same shot position but at a different depth below the earth's surface. The exact depths at which the several shots are detonated is unimportant provided these depths are appreciably different. The number of separate records needed depends upon the severity of the character changes observed in the particular area under investigation. Usually three or four records at each location are sufficient. The procedure above described is repeated for the remaining bore holes in the area being surveyed. Having obtained a series of records at each shot point in the area under investigation, the various series of records are then compared and from each series a record is selected which is most similar in character to a record similarly selected from each of the other series of records. These selected records are then used in making the depth computations.

Other objects, novel features and advantages of this invention will become apparent from the following specification and accompanying drawing, in which Fig. 1 diagrammatically illustrates the invention, and Fig. 2 diagrammatically illustrates the area under survey.

In Fig. 1, A represents a hole bored in the earth to any desired depth while $S_1$, $S_2$ $S_3$ $S_4$ $S_5$ and $S_6$ represent seismometers arranged at different distances from the mouth of the hole. The seismometers are suitably connected to a recorder R which is designed to produce traces of the waves received by the various seismometers. The first explosive charge is detonated near or at the bottom of the bore hole and the position of said charge is indicated by the reference character $O_1$. The successive explosive charges are detonated at progressively higher positions in the bore hole and such positions are indicated by the reference characters $O_2$, $O_3$ and $O_4$. The lines $P_1$ $P_2$ $P_3$ $P_4$ $P_5$ and $P_6$ indicate the paths followed by waves produced by the detonation of the charge at the position $O_1$ and reflected from the sub-surface horizon H to the various seismometers. For the sake of clearness, the wave paths are shown only in connection with the charge at the position $O_1$. The hole A may be of any depth, but for illustration purposes, the hole may be considered as 200 feet deep with the position $O_1$ at the bottom of the hole, the position $O_2$ at a depth of 150 feet, the position $O_3$ at a depth of 100 feet and the position $O_4$ at a depth of 50 feet. The position $O_1$ need not be at the bottom of the hole, but the hole may be continued some distance therebeyond. The seismometers may be placed at any suitable distance from a mouth hole A but for illustration purposes, they may be assumed to be spaced respectively 2,000; 2,200; 2,400; 2,600; 2,800 and 3,000 feet from the mouth of the hole. A seismometer $S_7$ is arranged at the surface of the earth at the mouth of the hole and is connected to the recorder R so that its output also is recorded. By means of the seismometer $S_7$, the travel time of the seismic wave from the seismic charge to the surface of the earth is accurately determined. From a knowledge of this time interval, corresponding phases of each record made from the same shot point can be determined since the time from the shot instant to a given phase plus the travel time from the seismic charge to the surface directly above, is constant.

The same procedure is followed with respect to other bore holes in the area under survey and Fig. 2 illustrates a common arrangement of shot positions and recording positions followed in the correlation method of seismic surveying. In Fig. 2, A indicates the bore hole illustrated in Fig. 1, while $A_1$, $A_2$ and $A_3$ represent additional bore holes, it being understood that the number of bore holes is dependent upon the extent and character of the area under survey. The recording positions for the various bore holes are indicated by the reference characters R, $R_1$, $R_2$ and $R_3$, there being a plurality of seismometers at each recording position as illustrated in Fig. 1. The various series of records obtained from the shots made in the area under investigation are compared and from each series a record is selected which is most similar in character to a record selected from each of the other series of records. The records thus selected are used in making the depth computations.

The practice of the method above described results in obtaining a series of records at each shot location in the area under investigation and from such series of records distinctions may be made between those accidental variations in character caused by the difference in excitation and those caused by actual changes in the subsurface conditions. In many cases it is possible to make a correct correlation of the reflections obtained in different portions of a given area where such correlation would be impossible were only a single record obtained at each location.

In practicing this invention, it is immaterial whether the successive records be taken with the seismic charges planted at different depths in the same hole or whether they are planted at different depths in closely adjacent holes. It is essential only that the different depth charges be detonated in holes substantially the same distance from the seismometers and in the same direction.

I claim:

In the method of seismic surveying by correlation of reflection records produced by detonation of explosive charges in bore holes in an area characterized by a surface layer of such nature that a charge detonated at some depth or depths in a bore hole produces a seismic record which is not correlatable with records obtained by detonating charges in other similar bore holes in that area, the procedure which consists in successively detonating a plurality of charges at different depths in each bore hole, making at each of a plurality of recording stations associated with said boreholes separate records of the seismic waves produced by the detonation of each individual charge and, for correlation purposes, selecting from the series of records made at the various recording stations a group of records consisting of one record from each recording station having the greatest similarity each to the other.

BENJAMIN B. WEATHERBY.